(No Model.)
J. McWILLIAMS.
PRUNING IMPLEMENT.
No. 279,413. Patented June 12, 1883.
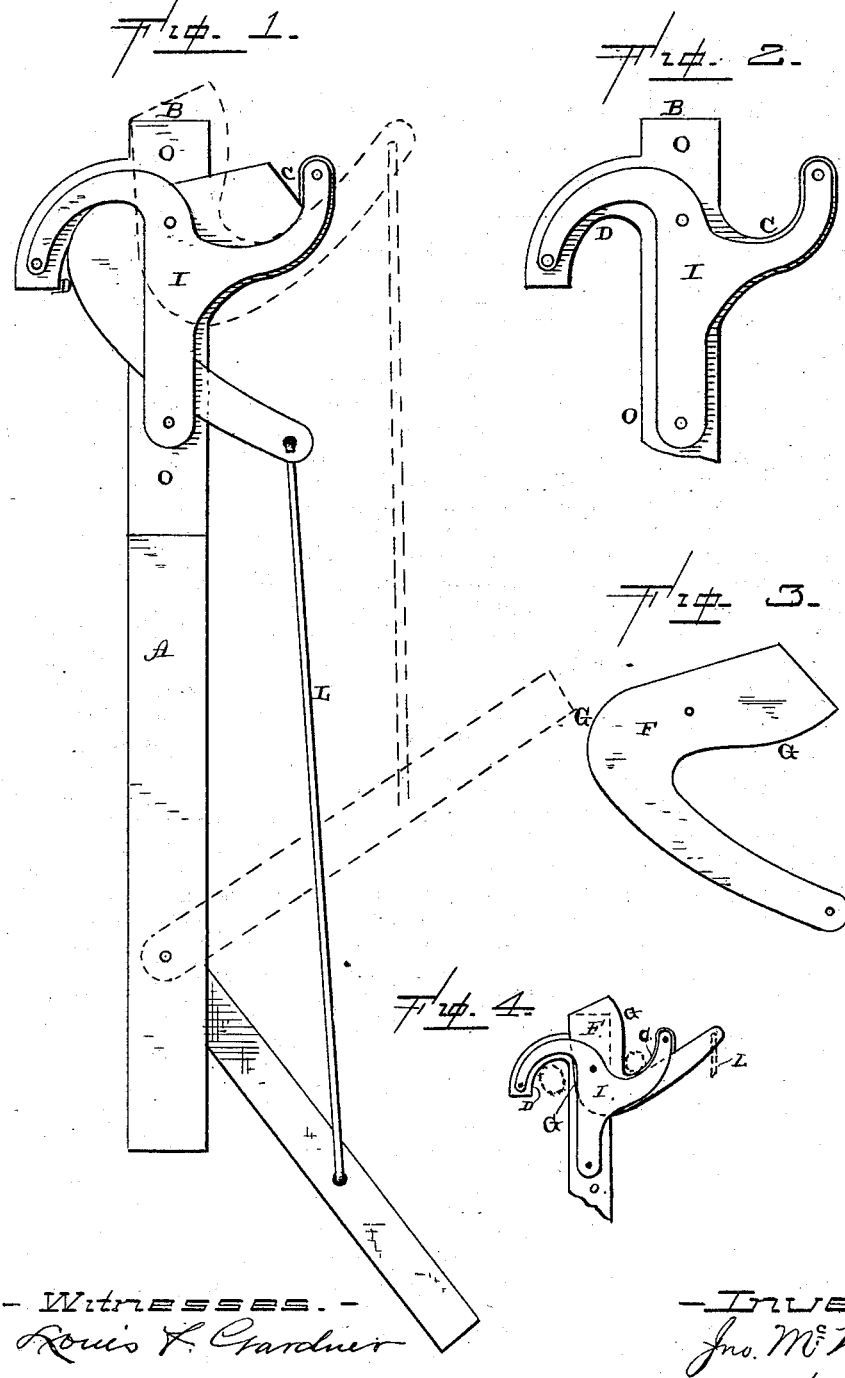
Witnesses.
Louis F. Gardner
J.W. Garner
Inventor.
Jno. McWilliams,
per
F. A. Lehmann,
Atty.

UNITED STATES PATENT OFFICE.

JOHN McWILLIAMS, OF PRAIRIE CITY, IOWA.

PRUNING IMPLEMENT.

SPECIFICATION forming part of Letters Patent No. 279,413, dated June 12, 1883.

Application filed April 30, 1883. (No model.)

*To all whom it may concern:*

Be it known that I, JOHN McWILLIAMS, of Prairie City, in the county of Jasper and State of Iowa, have invented certain new and useful Improvements in Pruning Implements; and I do hereby declare the following to be a full, clear, and exact description of the invention, such as will enable others skilled in the art to which it pertains to make and use it, reference being had to the accompanying drawings, which form part of this specification.

My invention relates to an improvement in pruning implements; and it consists in the combination of the body provided with an inwardly-cutting chisel, and two arms or hooks which are turned in opposite directions and each provided with a cutting-edge, with the lever which is pivoted upon the body and provided with two cutting-edges, which act in connection with the cutting-edges upon the two hooks, so that when the outer end of the lever is drawn downward both cutting-edges may be brought into play at the same time, as will be more fully described hereinafter.

The object of my invention is to provide a cutting implement which consists of simply three parts, and which is designed to cut off branches of trees in whatever position they may be found.

Figure 1 is a side elevation of my invention complete. Fig. 2 is a similar view of the body and guide alone. Fig. 3 is a detail view of the cutting-lever; and Fig. 4 is a side elevation, showing the knife in the act of cutting a limb or bough with each of its cutting edges.

A represents a suitable handle, of any desired length, to the upper end of which the body O is secured in any suitable manner. This body has its upper end shaped so as to form a chisel, B, for cutting upward, and into the two hooks C D, which are turned in opposite directions and each provided with a cutting-edge. One of these hooks is designed to be used by catching underneath the branch which is to be cut off, and the other by catching over it. Pivoted to the side of this body is the bent cutting-lever F, which is provided with two cutting-edges, G, so as to act in connection with both of the hooks together or either one alone. Secured to the side of the body, and over the outer side of this lever, is a flat plate, I, which holds the lever rigidly in place and prevents any side play under any circumstances. The outer end of this lever has a wire, L, fastened to it, which passes down through suitable guides attached to the handle, and has its lower end fastened to a suitable operating-lever, whereby the cutting-lever can be drawn downward with any desired degree of force. When the outer end of this cutting-lever is drawn downward, both of its cutting-edges move in an opposite direction to the hook in connection with which it operates, so as to cut off any limb or branch which may have been caught by the hook. Where no side plate is used for the purpose of keeping the cutting-lever and the body pressed closely together, and to act as a guide for the lever, the lever will not operate very long before it becomes more or less loose, and then the effectiveness of the implement is greatly impaired. Where this guide is used the lever can never become loose and must always wear evenly and true under any and all circumstances.

Having thus described my invention, I claim—

As a new article of manufacture, a pruning implement consisting of a body, O, provided with a chisel, B, and the two hooks C D, turned in opposite directions, in combination with the pivoted cutting-lever provided with two cutting-edges, and a guiding-plate which is secured to the body O, substantially as shown and described.

In testimony whereof I affix my signature in presence of two witnesses.

JOHN McWILLIAMS.

Witnesses:
JAMES N. PORTER,
JOHN K. LYON.